Oct. 26, 1965 J. L. VAN DEN KIEBOOM 3,213,711
DRIVE FOR MACHINE TOOLS
Original Filed March 19, 1959 3 Sheets-Sheet 1
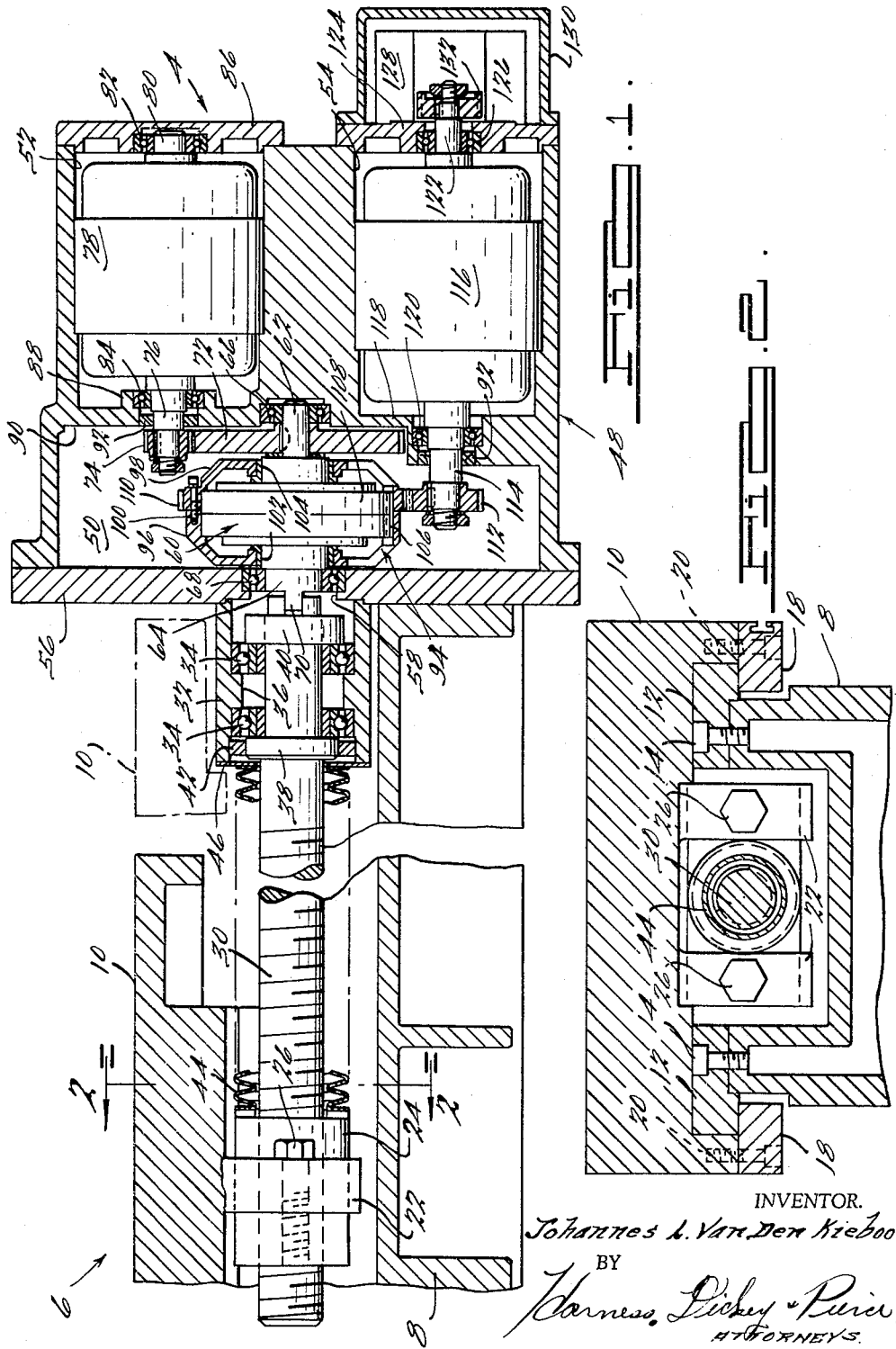
INVENTOR.
Johannes L. Van Den Kieboom
BY
Harness, Dickey & Pierce
ATTORNEYS Oct. 26, 1965   J. L. VAN DEN KIEBOOM   3,213,711
DRIVE FOR MACHINE TOOLS
Original Filed March 19, 1959   3 Sheets-Sheet 2
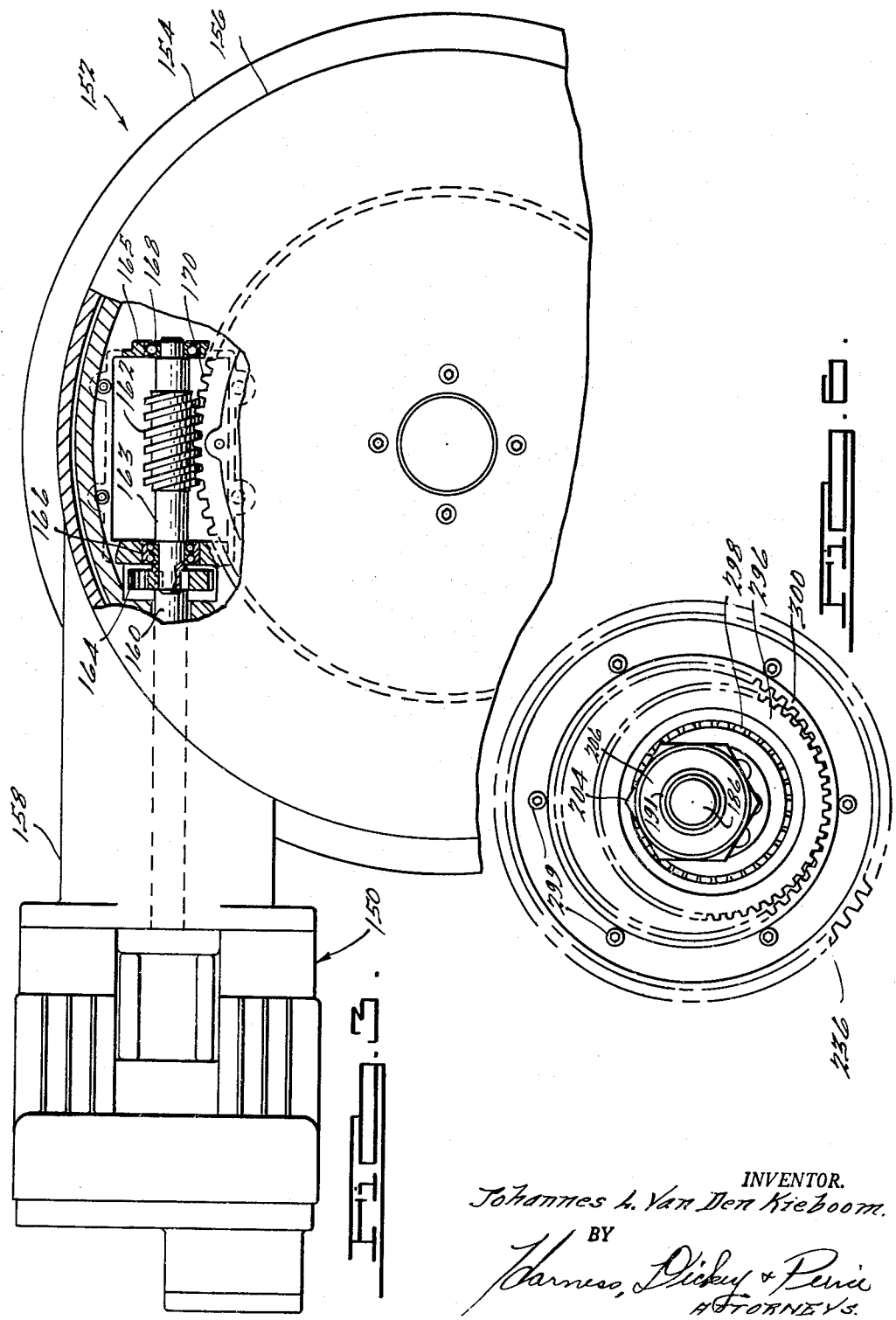
INVENTOR.
Johannes L. Van Den Kieboom.
BY
Harness, Dickey & Pierce
ATTORNEYS.

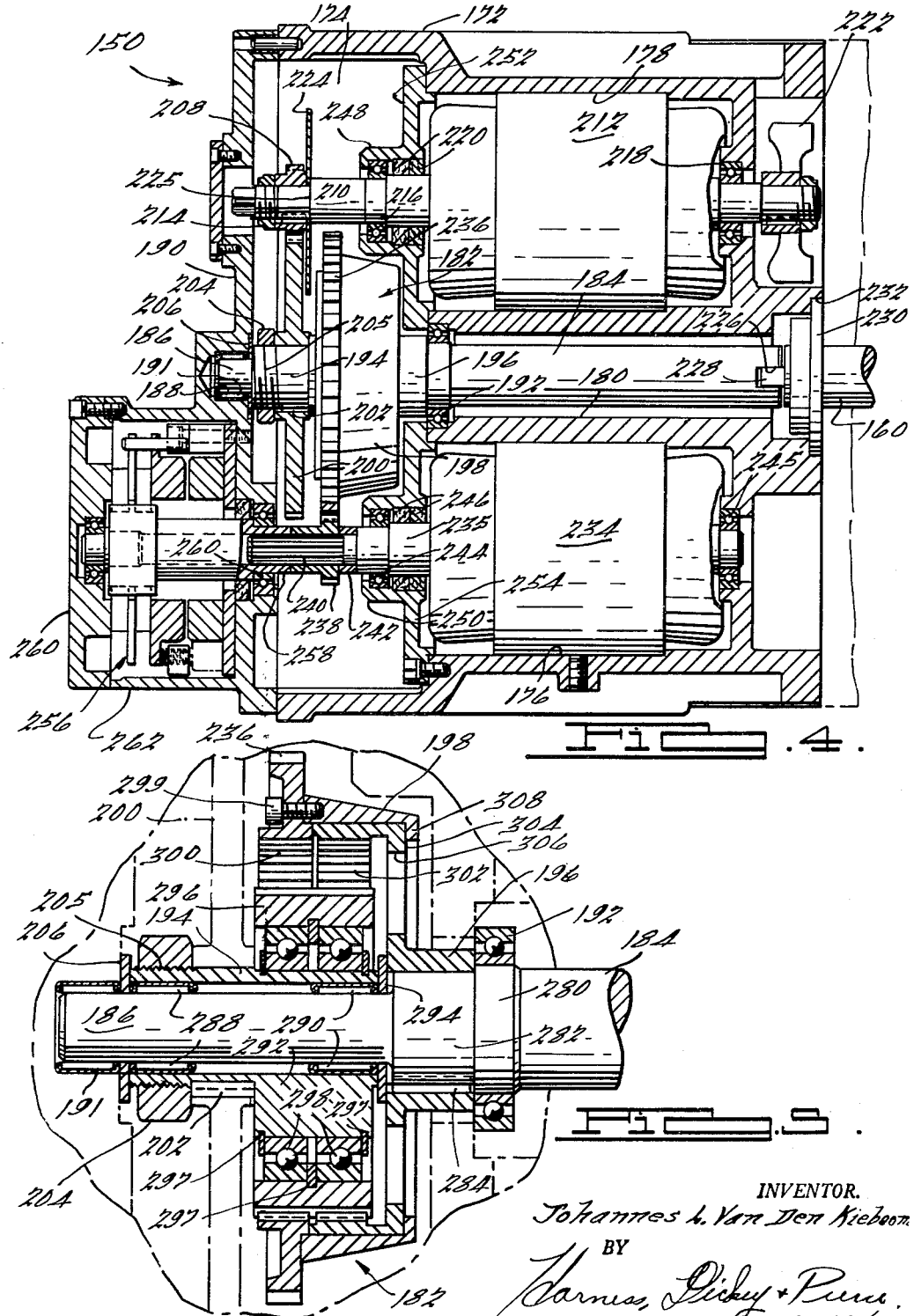

United States Patent Office 3,213,711
Patented Oct. 26, 1965

3,213,711
DRIVE FOR MACHINE TOOLS
Johannes L. van den Kieboom, Mount Clemens, Mich., assignor to The Cross Company, Detroit, Mich., a corporation of Michigan
Continuation of application Ser. No. 800,578, Mar. 19, 1959. This application Jan. 13, 1964, Ser. No. 337,482
2 Claims. (Cl. 74—675)

This invention relates to drive mechanisms for machine tools and more particularly to a simplified drive mechanism for providing both a rapid traverse and a slow rate of feed for a machine tool and is a continuation of my copending application Serial No. 800,578, now abandoned, filed March 19, 1959, entitled "Drive for Machine Tools."

Many machine tools employ a conventional right angle drive speed reducing unit for providing a slow rate of feed to perform a cutting operation, together with a secondary driving means by-passing the speed reducing unit, to provide a rapid traverse for quickly moving the machine tool to and from cutting position. This arrangement, however, is complicated and costly, as well as bulky and space consuming. The reason for this is that because of the high gear reduction required by many machine tools, the conventional speed reducing units that must be employed are in themselves bulky and expensive and, in addition, a separate clutch assembly and mechanism for actuating the clutch assembly usually must be provided for by-passing the speed reducing unit as described above. These additional units add to the cost and size of the drive mechanism and manifestly a more simple, less complex arrangement that would reduce the size of the drive mechanism, as well as its cost, would be extremely desirable.

It is one object of the present invention to provide a drive mechanism for a machine tool which provides both a rapid traverse and a very slow feed rate and is more simple and economical than prior art drives and also smaller and more compact than prior art drives.

It is another object of the present invention to provide a drive mechanism for a machine tool employing a speed reducing unit having coaxially aligned input and output shafts which is adapted to provide both a slow feed rate and a rapid traverse for the machine tool.

It is a further object of the invention to provide a drive mechanism for a machine tool that embodies a speed reducing unit having coaxially aligned input and output shafts positioned within a main housing mountable on the machine tool in a manner to enable the reducing unit and other components of the drive mechanism to be conveniently reached for repair and servicing without removing the main housing from the machine.

Other objects, features and advantages of the present invention will become apparent from the following detailed description taken in conjunction with the accompanying drawing in which:

FIGURE 1 is a broken sectional view of a machine tool having a drive mechanism thereon embodying features of the present invention;

FIG. 2 is a sectional view taken along the line 2—2 of FIG. 1;

FIG. 3 is a plan view, partially broken away, of another type of machine tool having a drive mechanism thereon embodying other features of the present invention;

FIG. 4 is an enlarged sectional view of the drive mechanism illustrated in FIG. 3;

FIG. 5 is an enlarged sectional view of the speed reducing unit of the drive mechanism illustrated in FIG. 4; and FIG. 6 is an end view of the speed reducing unit illustrated in FIG. 5 as viewed from the left end thereof.

Referring to FIGS. 1 and 2, a drive mechanism 4 embodying features of the present invention is illustrated as mounted on a machine tool 6 which requires both a slow rate of feed for performing a cutting operation and a rapid traverse for quickly moving the machine tool into cutting position. The machine tool 6 is herein disclosed by way of example only as comprising a base 8 having a saddle 10 slidably mounted on ways 12 which are fixed to the top of the base 8 by any suitable means, such as by bolts 14 or the like. The saddle 10 slides on the ways 12 and bars 18 are fixed to the bottom of the side edges thereof by suitable bolts 20 or the like, and overlap the ways 12 to retain the saddle 10 on the ways.

Suitable lugs 22 projecting downwardly from the underside of the saddle 10 have a running nut 24 secured therebetween by screws. The running nut 24 threadably engages a lead screw 30 having coarse threads and the right end of the lead screw 30, as viewed in FIG. 1, is rotatably supported in a cylindrical housing 32 fixed to the drive mechanism 4 in a manner to be described.

The right end of the lead screw 30 is rotatably mounted within the housing 32 by bearings 34 or the like which are spaced by an internal annular flange 36 of the housing with annular flanges 38 and 40 being provided on the lead screw to prevent axial movement of the latter relative to the housing 32. A suitable seal or packing 42 can be inserted in the left end of the housing 32 about the flange 38 to prevent dirt and the like from entering, and a bellows-type sleeve 44 is disposed about the lead screw with the left end thereof fixed to the running nut and the right end thereof fixed to a washer-like element 46 attached to the left end of the housing 32 as viewed in FIG. 1.

With this construction the rotation of the lead screw by the drive mechanism 4, as will be described, drives the running nut 24 which, in turn, reciprocates the saddle 10 relative to the base 8 of the machine tool 6. The saddle 10 of course may be used to carry any part or mechanism of a machine tool that has a reciprocatory motion in the operation of the machine. For example, it is conventional practice to mount a tool head on a reciprocable saddle of the type shown at 10.

The embodiment of the drive mechanism 4, illustrated in FIG. 1, is comprised of a housing 48 having a large chamber 50 opening on the left end thereof and smaller chambers 52 and 54 opening on the right end thereof. A cover plate 56 having a central aperture 58 is fixed to the left end of the housing 48 to enclose the chamber 50, and also serves as a means for mounting the housing 48 on the right end of the base 8 as viewed in FIG. 1. The cylindrical housing 32 is fixed to the cover plate 56 in coaxial alignment with the aperture 58 therein so that the lead screw 30 is rotatably supported in coaxial alignment with the aperture 58.

A speed reducing unit 60 operating on a differential drive principle has a coaxially aligned input shaft 62 and output shaft 64 supported within the chamber 50 in coaxial alignment with the lead screw 30 by bearings 66 and 68 respectively, the bearing 66 being seated in a counterbore in the wall of the housing 48 forming the right end of the chamber 50, and the bearing 68 being seated in the central aperture 58 of the cover plate 56.

The left end of the output shaft 64 is keyed to the right end of the lead screw 30 by a tongue and groove connection as at 70 and gear 72 is keyed to the input shaft 62 in position to be engaged by a pinion 74 fixed on an output shaft 76 of a reversible motor 78, the motor 78 being disposed within the chamber 52 in the housing 48 and having a stub shaft 80 extending from the right end thereof rotatably supported by a bearing 82 with the output shaft 76 of the motor being rotatably supported by a bearing 84. The bearing 82 is seated in an end plate 86 covering the right end of the chamber 52 and the bearing 84 is seated in a boss 88 projecting outwardly from the right side of wall 90 separating the chambers 50 and 52, the wall 90 having a central aperture through which the output shaft 76 extends. A seal 92 is disposed within the aperture and about the output shaft 76 on the left side of the bearing 84 to prevent foreign matter from passing therethrough.

With this construction the saddle 10 can be driven at a slow feed rate by the motor 78 by virtue of the gear reduction provided by the pinion 74 and gear 72 and the speed reducing unit 60 which can be the type described in U.S. Patent 1,543,791 developed by Universal Gear Corporation of Indianapolis, Indiana, and sold under the name Heliocentric Drive or the reduction unit developed by the United Shoe Machinery Corporation, in Beverly, Massachusetts, and sold under the name Harmonic Drive, or an equivalent type illustrated in FIG. 5 and to be described having coaxially aligned input and output shafts drivingly connected by what may be designated as differential driving means.

In order to provide the saddle 10 with a rapid traverse to enable it to be quickly and rapidly moved to the position where a cutting operation is to be performed, a cage 94 comprising cup-shaped left and right portions 96 and 98 joined together at their abutting peripheries by suitable screws 100 or the like is rotatably mounted on the speed reducing unit 60 by bushings 102 and 104. The cage 94 is keyed as at 106 to an outer ring portion 108 of the speed reducing unit 60 and a plurality of gear teeth 110 are formed on the periphery of the cup-shaped portion 98 so as to project radially outwardly therefrom and extend axially thereof. The gear teeth 110 are engaged by a pinion 112 keyed to an output shaft 114 of a second reversible motor 116 disposed within the chamber 54 of the housing 48. The output shaft 114 extends through and is journalled within a central aperture in a wall 118 dividing the chambers 50 and 54 by a bearing 120 in substantially the same manner that the output shaft 76 of the motor 78 was journalled in the aperture of the wall 90. A seal 92 is also disposed about the shaft 114 on the left side of the bearing 120 to keep out foreign material.

The other end of the motor 116 has a stub shaft 122 extending through and journalled in the central aperture of an end plate 124 covering the open end of the chamber 54 by a bearing 126. A braking mechanism 128 disposed within a cup-shaped housing 130 removably attached to the end plate 124 cooperates with a pinion 132, or the like, mounted on the end of the stub shaft 122 in a conventional manner to brake the stub shaft 122 and output shaft 114 of the motor 116 against rotation when the motor is not energized and to permit the shafts to freely rotate when the motor is energized. Since the braking mechanism 128 and the manner in which it cooperates with the motor 116 to resist rotation of the shafts when the motor 116 is not energized is conventional, it will not be described in further detail.

When the motor 116 is energized, the pinion 112 on the output shaft 114 meshes with the gear teeth 110 to rotate the cage 94, which, in turn, rotates the outer ring portion 108 of the speed reducing unit 60 because they are keyed together at 106 as previously described. Rotation of the ring portion 108 drives the output shaft 64 directly through the aforementioned differential driving means at substantially the same r.p.m. as the ring portion and the output shaft, in turn, rotates the lead screw 30 at a rapid traverse rate determined primarily by the gear ratio between the pinion 112 and the gear teeth 110 on the cage 94. Further, by virtue of the construction of the two abovementioned gear reduction units, the motor 78 can be either energized or de-energized at the time the motor 116 is energized without significantly affecting the reduction in speed between the output shaft 114 of the motor 116 and the output shaft 64 of the speed reducing unit 60.

Thus, the drive mechanism 4 of the present invention enables the saddle 10 to be rapidly moved to a position where a cutting operation is to begin by energizing the motor 116 which is, in effect, geared directly to the output shaft 64. Once the saddle has moved to this position the motor 116 can be de-energized and the saddle driven at the slow feed rate by the motor 78, since it is geared to the input shaft 62 of the speed reducing unit 60 and consequently drives the output shaft 64 at a much slower speed.

While the motor 78 is energized to move the saddle 10 at a slow feed rate, the motor 116 is de-energized and the brake 128 is actuated to resist rotation of the stub shaft 122 and the output shaft 114 of the motor 116. This prevents the cage 94 from rotating which, in turn, retains the outer ring portion 108 of the speed reducing unit 60 against movement so that the gear reduction unit will operate to provide the desired large reduction between the r.p.m. of the input shaft 62 and the r.p.m. of the output shaft 64, which drives the lead screw 30.

It will be noted that the rotary driving connection between the external ring gear 110 and the pinion 112 is reversible and this is significant and important in a machine tool drive particularly where the saddle 10 carries a tool head and moves the cutting tool to and from a workpiece in the operation of the machine.

In the case of a facing tool, for example, the saddle 10 is advanced initially in a rapid traverse motion and then just prior to engagement of the tool with the work, the forward speed of the saddle is checked and the saddle is then advanced at a slower feed rate. In this manner, the tool is moved slowly into the work during the actual cutting operation. The saddle 10 advances to a final position against a fixed stop which prevents further movement of the tool into the work. In practice, however, it is not practical to stop the rotary motion of the tool immediately when the saddle 10 engages the stop. Rather, it is necessary that the tool continue to rotate for at least several revolutions so that it will properly clean up and finish the face of the cut. To this end, the feed motor 78 drives the feed screw 30 through the gear reducing unit 60 to advance the saddle 10 at the feed rate during the terminal portion of the forward movement and during the time the tool is making the actual cut on the work. The spindle which carries the cutting tool of course is rotatably driven independently according to conventional practice by a separate motor which forms a part of the tool head, and this motor continues to rotatably drive the cutting tool after the saddle 10 moves against the forward stop. Also, the feed motor 78 continues to apply torque to the feed screw 30 after the saddle 10 engages the stop. This is necessary in order to maintain forward pressure on the saddle so that the cutting tool can perform the clean-up operation. However, the feed screw 30 obviously cannot continue to rotate when forward motion of the saddle 10 is prevented by the stop and the torque applied by the feed motor 78 is relieved at this time through the gear reducing unit 60 to drive the traverse motor 116 in a reverse direction and against the holding action of the braking mechanism 128. Manifestly, in order to achieve this mode of operation, it is necessary that the rotary driving connection between the traverse motor 116 and the external ring gear 110 be such that the motor 116 can rotatably drive the housing in one direction during the traverse stroke and the housing can rotatably drive the motor 116 in a reverse direction during the dwell period at the end of the feed stroke. After the dwell period, the feed motor 78 and the spindle motor are de-energized according to conventional practice and the rapid traverse or the high speed motor 116 is operated to return the saddle 10 to its initial or starting position.

In order to more clearly understand the operation of the drive mechanism 4 of the present invention, the construction of the speed reducing unit 60 will be briefly described. The speed reducing unit 60 operates on the same general principles as the speed reducing unit 182 illustrated in FIGS. 4–6, and to be described, and is comprised of the outer ring portion 108 having an internal ring gear mounted therein which is stationary when the outer ring portion 108 is held against rotation by the pinion 112 when the brake 128 in actuated or engaged. The input shaft 62 of the gear reduction unit is a stub shaft which extends into and has the left end thereof journalled within the speed reducing unit 60. A cam is mounted on the left end of the input shaft 62 within the speed reducing unit 60 and engages an annular driven member disposed within the ring gear. As the cam is rotated within the driven member through one revolution by the input shaft 62, it cams portions of the driven member into engagement with the gear teeth on the stationary ring gear in such a manner that the driven member is rotated one or two gear teeth per revolution of the cam on the input shaft 62.

Thus, if the ring gear has 132 teeth and the driven member has moved two gear teeth per revolution of the input shaft 62, a gear reduction of 66:1 is provided. By forming the output shaft as part of the driven member or connecting it directly thereto, the 66:1 reduction ratio is obtained between the input shaft 62 and the output shaft 64. However, it is apparent that when the ring gear is directly driven by rotating the outer ring portion 108 of the gear reduction unit by the motor 116, as previously described, and, in accordance with the present invention, the driven member will be driven directly by the ring gear so that the saddle 10 will be moved at the high traverse rate of feed determined by the gear reduction between the pinion 112 and the gear teeth 110 on the cage 94.

To be more specific, the driven member of the previously mentioned Harmonic Drive is a flexible ring gear having one or two teeth less than the stationary internal ring gear. Rotation of the cam on the input shaft 62 cams different teeth of the flexible ring gear into engagement with the teeth of the internal ring gear so that after one revolution of the camming member the flexible ring gear (the driven member) is rotated a distance equal to the difference between the number of teeth in the two gears. In the speed reducing unit described in the previously mentioned Patent No. 1,543,791, the driven member is a ring having a plurality of radially extending plungers slidably mounted therein, there being one or two fewer plungers than gear teeth on the stationary internal ring gear. Rotation of the cam on the input shaft 62 progressively actuates the plungers into engagement with the teeth of the internal ring gear so that after one revolution of the cam the driven member is rotated a distance equivalent to one or two gear teeth.

Referring to FIG. 3, a drive mechanism 150 representing a preferred form of the present invention and operating on the same general principle as the drive mechanism 4 of FIG. 1 is illustrated as mounted on a machine tool 152 for imparting a rotary movement thereto. The machine tool 152 comprises a base 154 having a circular table 156 rotatably mounted thereon. The drive mechanism 150 is mounted on a flanged projecting portion 158 which houses a shaft 160 partially illustrated in dotted lines. One end of the shaft 160 is drivingly connected to the output shaft of the drive mechanism as will be described and the other end thereof is drivingly connected to a worm 162 on a shaft 163 by change gears 164. Only one change gear is illustrated which is keyed directly to the shaft 163, the other gear being disposed immediately below the gear shown and keyed directly to the shaft 160. The shaft 163 is rotatably supported in a housing 165 at both ends thereof by bearings 166 and 168 and the worm 162 thereon meshes with a relatively large worm wheel 170 disposed beneath and drivingly connected to the circular table 156 so as to rotate the table at a greatly reduced r.p.m. as compared to the r.p.m. of the motor in the drive mechanism 150 that drives the table.

Referring to FIG. 4, the drive mechanism 150 is illustrated in greater detail and as mentioned previously, although its construction differs from the drive mechanism 4 of FIG. 1, it operates on the same general principles. The drive mechanism 150 is comprised of a housing 172 having a large chamber 174 opening on the left end thereof, and two spaced smaller chambers 176 and 178 having their left ends opening on the chamber 174. A central aperture 180 is also formed in the housing and extends between the chambers 176 and 178. A speed reducing unit 182 is rotatably supported within the chamber 174 by a shaft 184 extending therethrough as will be described, a reduced left end portion 186 of the shaft being journalled by roller or needle bearings 191 in a bore 188 of a cover plate 190 closing the left end of the chamber 174. The shaft 184 is also supported intermediate the ends thereof by a bearing 192 seated in the housing 172 adjacent the left end of the aperture 180.

The speed reducing unit 182 also has an input shaft 194 rotatably mounted on the shaft 184 and drivingly connected to an output shaft 196 by differential drive means disposed within an outer ring portion or housing 198 of the speed reducing unit as will be described. The output shaft 196 is keyed to the shaft 184 as will be described and can be driven either by the rotation of the input shaft 194 or by the rotation of the housing 198, the former providing a large gear reduction, and the latter driving the output shaft substantially directly through the differential drive means.

A spur gear 200 is keyed to the input shaft 194 by a key 202 or the like and is retained axially thereon by a nut 204 engaging external threads 205 of the input shaft. A thrust washer 206 is disposed between the cover plate 190 and the end of the input shaft 194 to reduce friction therebetween. The spur gear 200 is driven by a pinion 208 keyed to an output shaft 210 of an electric motor 212 disposed within the chamber 178, the pinion 208 being secured on the shaft 210 by a nut 214. The shaft 210 extends through the motor 212 and is journalled in the housing 172 by bearings 216 and 218 adjacent each end of the motor, suitable seals 220 being disposed about the shaft 210 adjacent the bearing 216. A suitable cooling fan 222 may be mounted on the right end of the shaft if desired. An oil flinger 224 may also be positioned between a shoulder 225 on the shaft 210 and the pinion 208 to throw or fling lubricating oil radially outwardly within the housing.

Of course, with this construction when the motor 212 is energized it drives the input shaft 194 through the pinion 208 and spur gear 200 which in turn drives the output shaft 196 through the differential drive means disposed within the housing 198 and to be described, and the output shaft 196 rotates the shaft 184 as previously described. The right end of the shaft 184 has a diametrical slot 226 which is engaged by a tongue 228 on the left end of the shaft 160 which can be journalled within the housing 172 by suitable bearings disposed within a retaining ring or housing 230 seated in a counterbore 232 in the right end of the central aperture 180. This construction drivingly connects the shaft 184 to the shaft 160 of the machine tool 152.

To rotate the shaft 184 at a high speed to provide the rapid traverse for the machine tool, a second motor 234 is disposed within the chamber 176 and output shaft 235 thereof is drivingly connected to a gear 236 by a pinion 238 keyed to a splined end portion 240 of the shaft 235, the gear 236 being secured to the housing 198 as will be described. A suitable spacer 242 is provided between the right end of the pinion 238 and a shoulder of the shaft 235. The shaft 235 extends through the motor 234 and is journalled in the housing 172 by bearings 244 and 245 with seals 246 being disposed about the shaft adjacent the bearing 244. It will be observed that each of the bearings 216 and 244 which support the output shafts 210 and 235 adjacent the left end of each of the motors are seated in central apertures of the bosses 248 and 250 of cover plates 252 and 254, respectively, which enclose the left ends of the chambers 178 and 176, respectively.

A suitable brake mechanism 256 is mounted on the lower end of the cover plate 190 as viewed in FIG. 4, and includes a hollow output shaft 258 extending through and journalled in the cover plate by a bearing 260, the shaft 258 being slidably keyed to the splined portion 240 and abutting against the pinion 238 to prevent axial movement of the pinion to the left.

With this construction when the brake 256 is energized or actuated, it resists rotation of the shaft 235 of the motor 234 and consequently rotation of the housing 198. The motor 212 can then be energized to rotate the input shaft 194 which in turn rotates the shaft 184 at the greatly reduced speed. Similarly, when the motor 234 is energized and the brake 256 de-energized the housing 198 is rotated directly and therefore directly rotates the output shaft 196 and shaft 184 through the aforementioned differential drive means disposed within the housing 198.

Thus, it can be seen that the drive mechanism 150 operates on the same general principles as the speed reducing unit 60 of the drive mechanism 4 of FIG. 1, even though the speed reducing unit 182 is actually disposed in the end of the drive mechanism furthest removed from the machine tool whereas the speed reducing unit 60 of the drive mechanism 4 of FIG. 1 is disposed on the end thereof nearest the machine tool. By mounting the speed reducing unit 182 on the left end of the drive mechanism 150 as viewed in FIG. 4 an important advantage is realized in that the change gears 208 and 200 can be reached by just removing cover 190 and the speed reducing unit can be removed or reached for repair without having to remove the entire drive mechanism from the machine tool 152. This can be accomplished by merely removing the cover plate 190. Further, if it is desired to remove the brake mechanism 256 a cover plate 261 secured to a cylindrical wall portion 262 projecting from the cover plate 190 can be removed and the entire brake mechanism slipped out of the chamber formed by the cylindrical wall portion 262 since it is slidably keyed to the splined portion 240. Still further, each of the motors 212 and 234 can be easily reached by merely removing the cover plates 252 and 254 without having to remove the main housing 172 from the machine tool.

In addition to the aforementioned advantages the speed reducing unit 182 constitutes a preferred unit as mentioned previously, and therefore is illustrated in greater detail in FIGS. 5 and 6, with the remaining elements of the drive mechanism shown in phantom for the sake of greater clarity. The manner in which the shaft 184 extends completely through the speed reducing unit is most clearly illustrated in these figures and it will be observed that the shaft 184 has a land portion 280 which is supported by the bearing 192 as previously described, and a second portion 282 of slightly reduced diameter to which the output shaft 196 is keyed by a key 284 with the right end of the output shaft bearing against the annular shoulder formed between the portions 280 and 282. The remaining portion of the shaft 184 is reduced in diameter to provide the reduced end portion 186 which is journalled in the cover plate 190 by the bearings 191 as previously described.

It will be observed that the input shaft 194 of the speed reducing unit 182 is rotatably mounted on the reduced end portion 186 by roller or needle bearings 288 and 290 and that the right end of the input shaft 194 has an enlarged eccentric cam portion 292 formed thereon. In addition to the thrust washer 206 engaging the left end of the input shaft 194 as previously described, a thrust washer 294 is also provided adjacent the right end of the input shaft to reduce friction. An external ring gear 296 is rotatably mounted on the eccentric cam portion 292 of the input shaft by ball bearings 298 positioned axially by three retaining rings 297. The gear 236 is secured to the periphery of the housing 198 by bolts 299 or the like and has an internal ring gear 300 formed on the inner periphery thereof the teeth of which mesh with the teeth of the external ring gear 296. The output shaft 196 has an internal ring gear 302 formed as an integral part thereof which is connected to the output shaft 196 by a radially extending flange portion 304 having a plurality of apertures 306 therein. The teeth of the internal ring gear 302 also mesh with the external ring gear 296. The housing 198 has a flange 308 projecting radially inwardly from the right end thereof and concentrically disposed relative to the output shaft 196. With this construction it is apparent that the housing 198 cannot move to the right as viewed in FIG. 5 since the gear 236 overlaps the internal ring gear 302, and the housing 198 cannot move to the left because the radially inwardly extending flange 308 also overlaps the internal ring gear 302.

With this construction it will be observed that the teeth of the external ring gear 296 only engage a few of the teeth of the internal ring gears 300 and 302 as most clearly illustrated in FIG. 6, so that when the input shaft 194 is rotated by the motor 212 through the spur gear 200 as previously described, the eccentric cam portion 292 will rotate to progressively engage different teeth of the external ring gear with different teeth of the internal ring gears 300 and 302. To obtain the desired gear reduction between the input shaft 194 and the output shaft 196, the internal ring gears 300 and 302 are provided with different numbers of teeth. For example, the internal ring gear 302 can be provided with one more tooth than the internal ring gear 300 so that when the internal ring gear 300 is held by the brake mechanism 256 as previously described and the eccentric cam portion 292 is rotated through one complete revolution in a clockwise direction as viewed in FIG. 6, the eccentric cam portion will rotate relative to the external ring gear 296 by virtue of the ball bearings 298 therebetween, and progressively mesh different teeth of the external ring gear with each of the teeth of the internal ring gear 300 until the external ring gear again assumes the position illustrated in FIG. 6. However, since the internal ring gear 302 has one more tooth than the internal ring gear 300, it is apparent that during the one revolution of the eccentric cam portion 292 the internal ring gear 302 will rotate in a clockwise direction a circumferential distance of one tooth to provide the large gear reduction desired. Conversely if the internal ring gear 302 has one less tooth than the internal ring gear 300 is will rotate one tooth in a counterclockwise direction per revolution of the input shaft 194 in a clockwise direction.

However, when the housing 198 is rotatably driven by the motor 234 as previously described, the external ring gear 296 will be driven through the internal ring gear 300 and in turn will directly drive the internal ring gear 302 which will drive the shaft 184 through the output shaft 196. It is further apparent that it does not make any difference whether or not the motor 212 is energized to rotate the input shaft 194 while the housing 198 is being rotated since this will only make a one tooth per revolution difference in the speed of the output shaft 196. It is apparent that in either event the output shaft is for all practical purposes directly driven when the housing 198 is rotated.

From the foregoing it will be apparent that the drive mechanism of the present invention provides an extremely rugged simple and effective mechanism for driving a machine tool, and specifically for driving machine tools having reciprocating or rotary tables, at a high rate of speed to provide a rapid traverse and at an exceptionally slow rate of speed with the gear reduction being primarily provided by the speed reducing units 60 and/or 182 and additional reduction being secondarily provided by the gears driving the input shaft and the gears connected between the output shaft and the machine tool. Further, the gear reduction unit 182 with the shaft 184 extending completely therethrough provides a particularly rugged durable unit.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

Having thus described the invention, I claim:

1. A mechanical drive unit for machine tools and the like comprising
- a housing having an open front end normally closed by a removable cover;
- traverse and feed motors mounted side by side in said housing in spaced apart relation and each having a drive shaft extending forwardly toward and terminating in proximity to the open end of said housing;
- a brake mechanism on said cover having an output shaft detachably coupled to the drive shaft of said traverse motor, said output shaft of said brake mechanism being journaled for rotation in said cover and rotatably supporting the coupled end of said traverse motor drive shaft and being automatically disengageable therefrom upon removal of said cover;
- support means mounted in said housing behind and spaced from said cover, said support means carrying bearings receiving and rotatably supporting the drive shaft of said traverse motor;
- drive pinions on the drive shafts of said traverse and feed motors forwardly of said support means and behind said cover;
- a speed reducer disposed in the housing between said cover and said support means and between said drive shafts, said speed reducer having a forwardly extending input shaft having one end thereof removably journaled in said cover, a rearwardly extending output shaft projecting from the rearward end of said housing and journaled for rotation therein at spaced points behind said support means,
- a differential drive operatively interconnecting said input shaft and said output shaft, and
- a rotatable outer part including a removable member facing the open end of the housing, said removable member being provided with an external gear engaging the drive pinion of said traverse motor and an internal gear cooperating with a removable external ring gear in and forming a part of said differential drive; and
- a driven gear on the input shaft of said gear reducer engaging the drive pinion of said feed motor,
    - all of said gearing and said removable member being readily accessible through the open end of said housing upon removal of said cover,
    - said driven gear and the drive pinion of said feed motor comprising primary change gears controlling the rate at which said feed motor drives the input shaft of said differential drive,
    - said external gear and the drive pinion of said traverse motor comprising change gears controlling the rate at which said traverse motor drives the rotatable output of said differential drive, and
    - said internal gear and said external ring gear comprising secondary change gears controlling said rotatable output drives the output shaft through said differential drive.

2. The combination set forth in claim 1 wherein said brake mechanism includes a casing surrounding the operating parts thereof, said casing having an outer opening through which said brake mechanism is removable without removing said cover from said housing.

References Cited by the Examiner

UNITED STATES PATENTS

| | | | |
|---|---|---|---|
| 1,108,422 | 8/14 | Barnum | 74—675 |
| 2,284,758 | 6/42 | Morton et al. | 74—675 |
| 2,300,343 | 10/42 | Clay | 74—675 |
| 2,427,135 | 9/47 | Guier | 74—661 |
| 2,463,349 | 3/49 | Baner. | |
| 2,519,042 | 8/50 | Granberg et al. | 74—675 |
| 2,828,649 | 4/58 | Boerdijk et al. | 74—675 |

FOREIGN PATENTS 829,950  5/38  France.

DON A. WAITE, *Primary Examiner.*